United States Patent [19]

Imai

[11] Patent Number: 4,825,065

[45] Date of Patent: Apr. 25, 1989

[54] APPARATUS FOR READING IMAGE RECORDED ON FILM

[75] Inventor: Ryoichi Imai, Tokyo, Japan

[73] Assignee: Canon Kabushiki Kaisha, Tokyo, Japan

[21] Appl. No.: 225,643

[22] Filed: Jul. 27, 1988

Related U.S. Application Data

[63] Continuation of Ser. No. 924,433, Oct. 29, 1986, abandoned.

[30] Foreign Application Priority Data

Oct. 31, 1985 [JP] Japan ............................ 60-245479
Oct. 31, 1985 [JP] Japan ............................ 60-245480

[51] Int. Cl.⁴ ............................................. G01J 1/32
[52] U.S. Cl. ................................. 250/205; 353/26 A; 250/578
[58] Field of Search .............. 250/205, 578, 234-235; 353/26 A; 358/209, 212, 213.13, 293, 294

[56] References Cited

U.S. PATENT DOCUMENTS

| | | | |
|---|---|---|---|
| 3,967,110 | 6/1976 | Rogers et al. | 250/234 |
| 4,250,488 | 2/1981 | Haupt | 250/205 |
| 4,651,226 | 3/1987 | Motoori et al. | 358/293 |
| 4,658,301 | 4/1987 | Toyoda et al. | 390/293 |

Primary Examiner—Edward P. Westin
Assistant Examiner—Khaled Shami
Attorney, Agent, or Firm—Fitzpatrick, Cella, Harper & Scinto

[57] ABSTRACT

A film image reading apparatus capable of exact image reading including the steps of regulating the quantity of light emitted by a light source before the film is set to the reading position, focusing a lens after the film is set, and determining the threshold value of an image sensor for quantization.

42 Claims, 13 Drawing Sheets

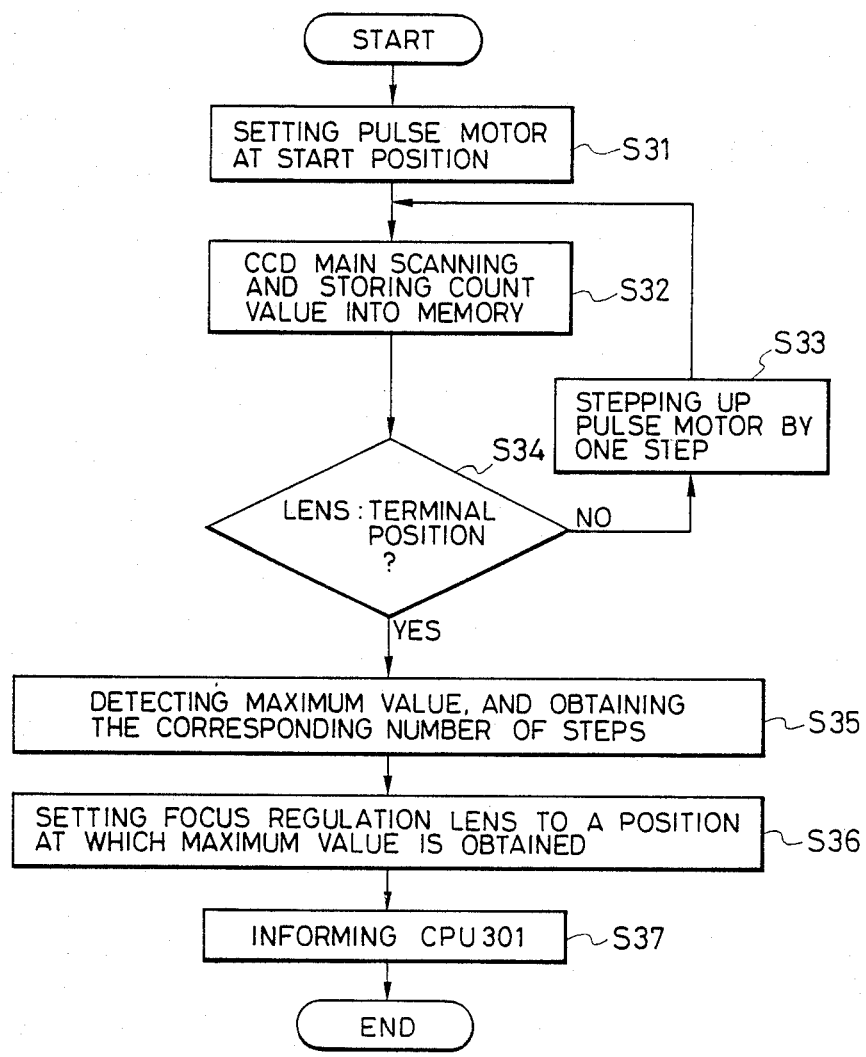

APPARATUS FOR READING IMAGE RECORDED ON FILM

This application is a continuation of application Ser. No. 924,433 filed Oct. 29, 1986, now abandoned.

BACKGROUND OF THE INVENTION

1. Field of the Invention

The present invention relates to a reading apparatus for reading an image recorded on a film by means of photoelectric conversion of transparence light quantity or reflection light quantity of the film exposed or illuminated by a light source.

2. Related Background Art

Microfilming of documents has been widely employed for reducing the space required for storing a large amount of documents or facilitating data retrieval.

On the other hand, owing to recent technical progress in electrical image processing, it has been proposed to read a microfilmed image with an image sensor with a photoelectric converting function such as a CCD image sensor and to effect display, recording, storage or transmission of the image based on thus obtained image signal.

Reading of a microfilmed image is generally conducted by illuminating a desired frame of microfilm with a light source, and focusing the transmitted light onto an image sensor for photoelectric conversion through an optical system such as a lens or a mirror. Consequently the density of the read image is influenced by the intensity of the light source illuminating the microfilm, and this intensity has to be regulated to an optimum value in order to achieve satisfactory image reading.

Also the light image has to be exactly focused onto the light-receiving face of the image sensor since otherwise, the obtained output will become blurred.

Furthermore, since the contrast of the microfilmed image is variable depending on the photographic conditions at recording and the film characteristics, a satisfactory image reading cannot be expected if the image signal from the image sensor is always processed in the same manner.

For this reason, the present applicant disclosed, in the U.S. patent application Ser. No. 878,790 a technology of regulating the amount of light of the light source for illuminating the film to a predetermined value upon detecting the amount of light. Also we disclosed, in the U.S. patent application Ser. No. 854,569 an automatic focusing technology in which the focusing is automatically conducted in accordance with a light image transmitted by a film. Furthermore we disclose,, in the U.S. patent application Ser. No. 878,790 a technology of varying the process for the image signal obtained from an image sensor, in accordance with measurement of the microfilmed image density.

However, these three technologies are in fact not independent. For example, the automatic focusing cannot be executed satisfactorily if the illuminating amount of light is not adequate. Also an inexact focusing will result in an incorrect measurement of image density, in turn leading to an improper automatic exposure operation.

SUMMARY OF THE INVENTION

In consideration of the foregoing, an object of the present invention is to provide a method, and an apparatus therefor, for satisfactorily reading an image recorded on a film, such as a microfilm, without manual regulation.

Another object of the present invention is to provide an image reading method, and an apparatus therefor, capable of satisfactorily effecting the regulation of film illumination, focusing on the image sensor, signal digitizing etc.

Still another object of the present invention is to provide an image reading method, and an apparatus therefor, effecting the steps of regulating the quantity of light generated by a light source before the film is loaded to a reading position, focusing an optical member after the film is set to the reading position, and determining the threshold value for quantitizing the output of an image sensor.

The foregoing and still other objects of the present invention, and the advantages thereof, will become fully apparent from the following description.

BRIEF DESCRIPTION OF THE DRAWINGS

FIG. 14 is a flow chart showing the control sequence of a control unit 21; and

DETAILED DESCRIPTION OF THE PREFERRED EMBODIMENTS

Figure 1:
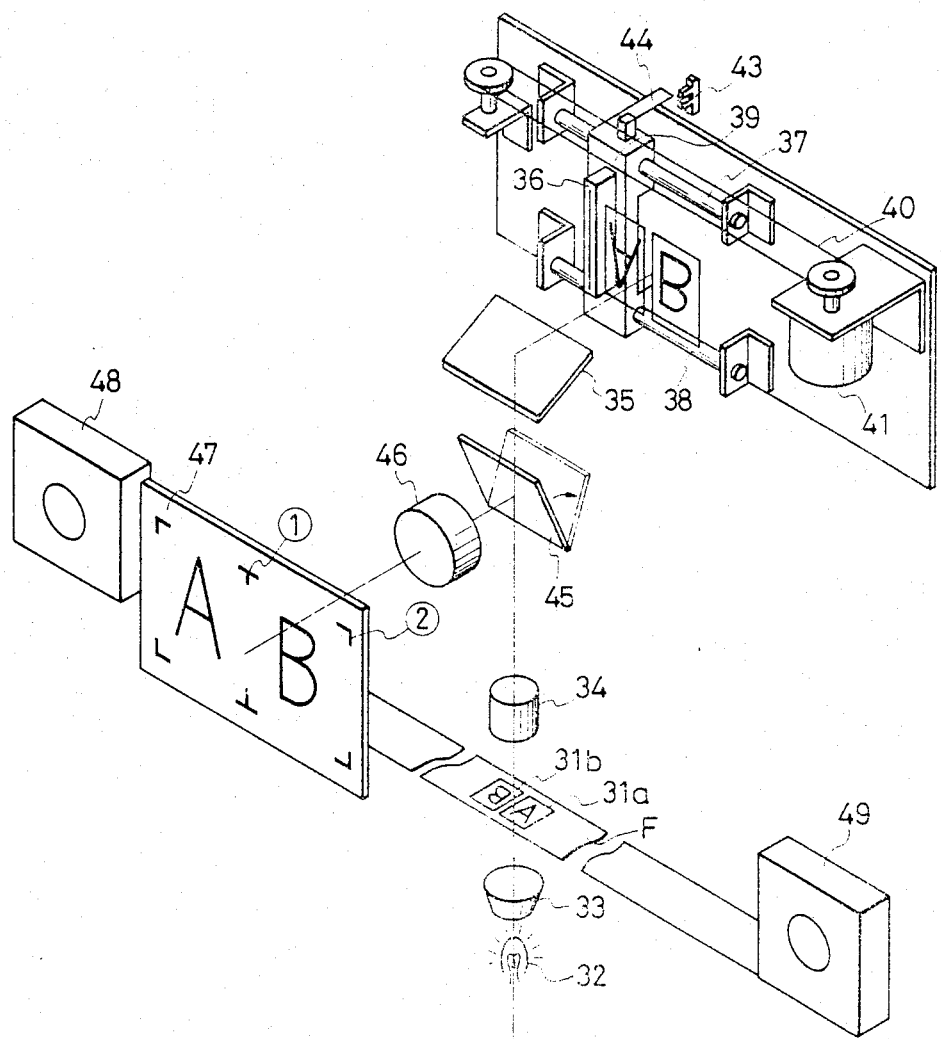
FIG. 1 is a schematic view of a microfilm reading apparatus of the present invention.

FIG. 1 schematically shows a microfilm reading apparatus embodying the present invention.

Film cassettes 48, 49 house a film F, of which frames 31a, 31b are illuminated by the light emitted by a halogen lamp 32 and concentrated by a condenser lens 33. The images of thus illuminated frames 31a, 31b of the film F are focused, through an optical system consisting of an imaging lens 34 and a fixed mirror 35, onto the scanning face of a one-dimensional line sensor 36, composed for example of a charge-coupled device (CCD) in which plural photosensor elements are arranged as an array along a main scanning direction. Line sensor 36 is fixed on a carriage 39, capable of a reciprocating motion along a pair of guide members 37, 38. The carriage 39 is linked to a wire 40 for converting the rotation of a motor 41 into a linear motion, so that line sensor 36 moves in a sub scanning direction, perpendicular to the main scanning direction, by the rotation of the motor 41, thus reading the image line by line. The image signal obtained by such image reading is released in binary encoded state.

On the main body of the apparatus there is provided a photointerruptor 43, which generates a timing signal indicating the start of the image scanning, when it is intercepted by a light shield plate 44 fixed to the carriage 39 in the course of motion thereof.

Between the image lens 34 and the fixed mirror 35, there is provided a movable mirror 45, so that the images of the frames 31a, 31b of the film F can also be focused in a magnified state on a display screen 47, through movable mirror 45 and a projection lens 46. On screen 47 there are printed a reading frame 1 for a halfsized image and another reading frame 2 for a full-sized image. The area in the former or latter reading frame is read and printed, for example by an unrepresented laser beam printer, respectively when a vertically or laterally oblong recording sheet is set on the printer.

Figure 2:
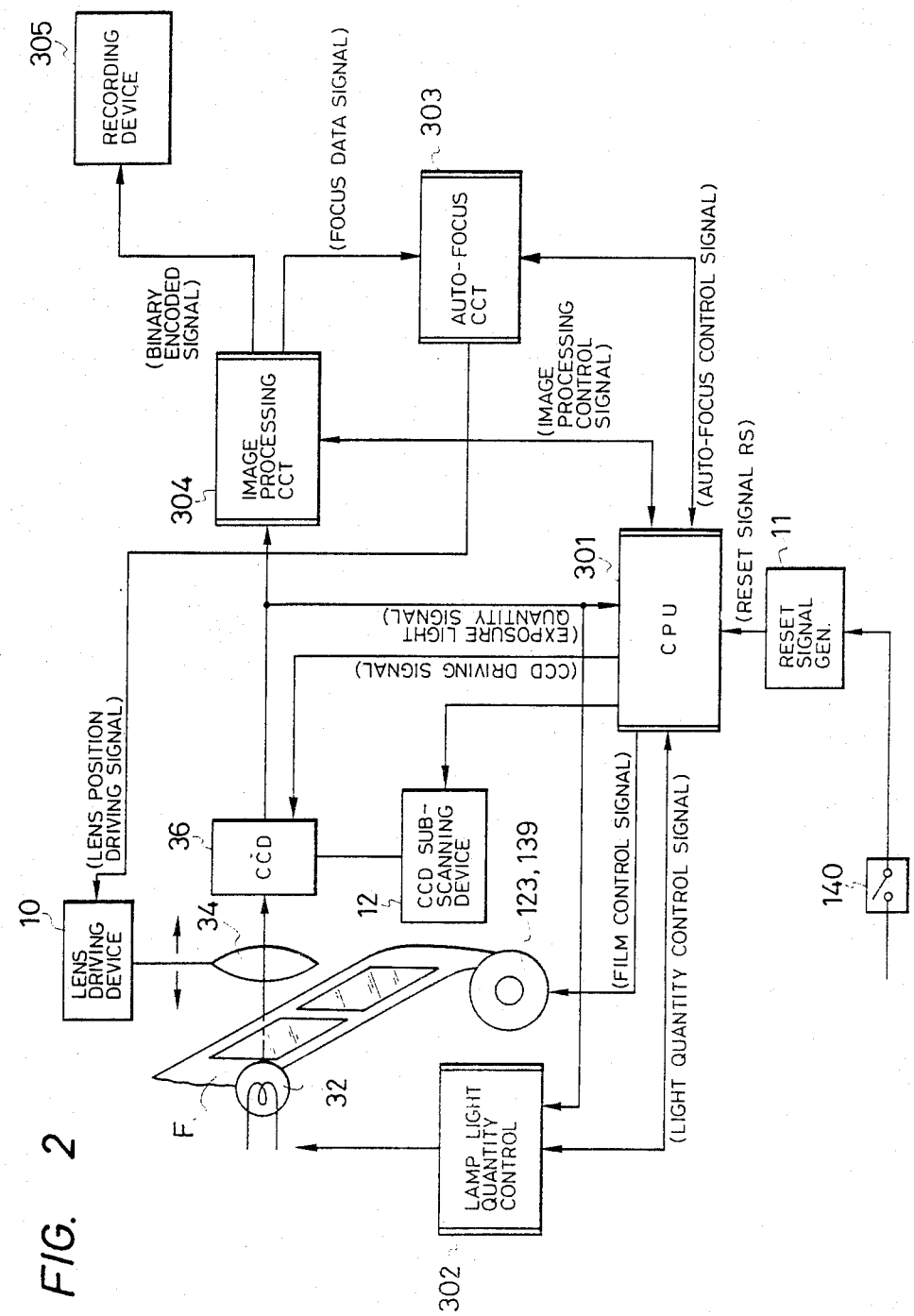
FIG. 2 is a block diagram showing control and process circuits the apparatus shown in FIG. 1.

FIG. 2 is a block diagram showing control and signal process circuits of the microfilm reading apparatus shown in FIG. 1.

A microfilm F bearing a recorded image thereon is illuminated by the light from a lamp 32. The transmitted light from the film F is projected onto the line sensor 36 by the lens 34, of which focus is adjustable by a stepping motor in a focusing device FD.

A CPU 301, composed of a microcomputer, controls the entire apparatus, including an image process circuit 304 for binarizing the output of the line sensor 36, an automatic focusing circuit 303 for focusing the lens 34, a lamp control circuit 302 for regulating the quantity of light emitted by the lamp 32 to a predetermined value, a CCD sub scanning device 12 for effecting the sub scanning operation through the motor 41, and film transport devices 123, 139 for transporting the film F to or from the cassettes 48, 49. At the star of power supply, the CPU 301 is initialized by a reset pulse signal RS generated by a reset signal generator 11 in accordance with the actuation of a power switch 140.

The image process circuit 304 binary encodes, by means of an internal comparator, the analog electrical image signal obtained from the line sensor 36, and effects, in reading a microfilmed image, a preliminary image reading operation for determining the threshold value for binarizing in the comparator, in accordance with the output of the image sensor 36. This operation, called automatic exposure (AE) operation, automatically determines the binary encoding threshold value in accordance with the density of the microfilmed image transported to the reading position.

The automatic focusing circuit 303 determines, from the output of the line sensor 36, the position of the lens 34 allowing to focus the microfilmed image onto the image sensor 36, and moves the lens 34 to an in-focus position by means of the stepping motor.

The lamp control circuit 302 controls the, current to the lamp 32 to regulate the quantity of light emitted therefrom in accordance with the output of the image sensor 36.

The CCD sub scanning device 12 is composed of a mechanism, including the aforementioned motor 41 for moving the image sensor 36 in a direction substantially perpendicular to the main scanning direction thereof.

The film transport devices 123, 139 advance or reverse the film F to or from the cassettes 48, 49 by means of motors, thus retrieving a desired image frame.

Figure 3:
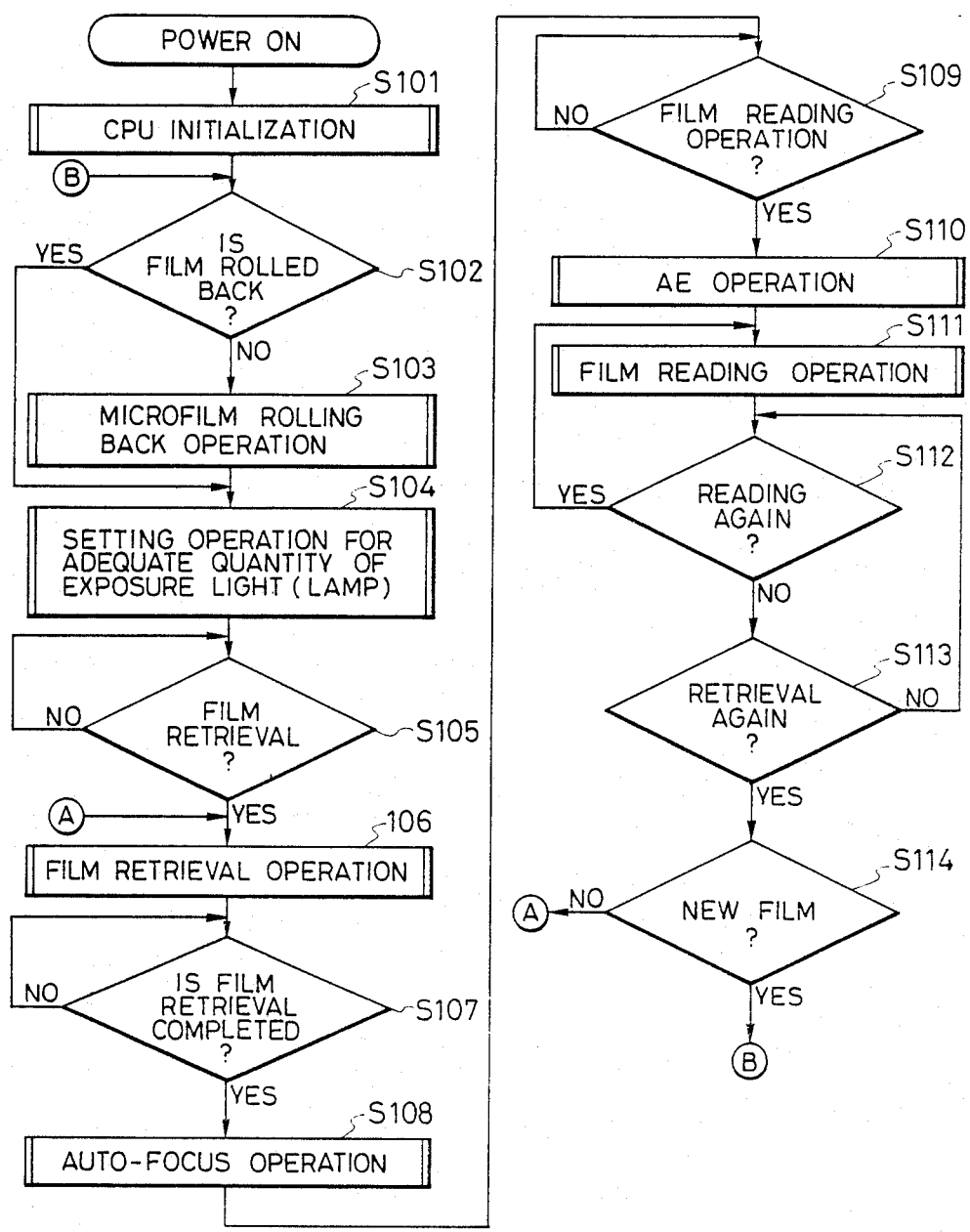
FIG. 3 is a flow chart showing the control sequence of a CPU 301.

FIG. 3 is a flow chart of the control sequence of the CPU 301, which executes said sequence accordance with a program stored in advance in an internal ROM.

In accordance with the actuation of the power switch 140, the reset signal generator 11 supplies a reset signal RS to the CPU 301, which thus initializes registers, memories, ports etc. (S101). After the initialization there is discriminated (S102) whether the film is absent in the reading position, i.e. whether the film has been rewound into a cassette. If not rewound, the film transport devices 112, 139 are activated to rewind the film (S103), thereby removing the film from the reading position. After the rewinding, or, if the film is already absent from the reading position, the lamp 32 is turned on, the quantity of light emitted therefrom is measured by the image sensor 36, and in accordance with a light amount control signal is supplied to the lamp control circuit 302 in order to regulate the light quantity to a predetermined value (S104).

Upon completion of the light quantity control, there is discriminated whether an image frame retrieval command has been entered from an unrepresented operation unit (S105). If such command has been entered, the film transport devices 123, 139 are activated to effect a film retrieval operation, thereby bringing a designated frame to the reading position (S106).

Upon completion of the retrieval of a designated frame on the film F (S107), the automatic focusing circuit 303 is activated to effect a focusing operation on the image at the reading position, in accordance with the image signal from the image sensor 36 (S108). The focusing operation can be conducted satisfactorily, since the light quantity of the light source has been optimized. Upon completion of the movement of the lens 34 to the in-focus position by the automatic focusing operation, there is discriminated whether a reading command has been entered from the aforementioned operation unit (S109).

In the presence of the reading command, the image process circuit 304 is caused to execute an automatic exposure (AE) operation (S110) in order to determine the threshold value for binary encoding the analog image signal from the image sensor 36. In this operation the image sensor 36 reads the image, while the image frame at the reading position is moved by the CCD sub scanning device 12. The image process circuit 304 identifies the image density from the obtained analog image signal and accordingly determines the threshold value. The automatic exposure operation can be conducted satisfactorily, since the quantity of light and the focus have been properly controlled.

After the determination of the threshold value in this manner, the CCD sub scanning device 12 moves the image sensor 36, thus effecting an image reading operation and supplying a binary image signal to a recording device 305 (S111). Upon completion of the reading operation, there is discriminated whether a repeated image reading is requested (S112), and, if requested, the image reading operation is repeated. On the other hand, if such is not requested, there is discriminated whether the retrieval of another image frame has been requested (S113). If requested, there are conducted retrieval of the image frame and image reading thereof. Also, in case such retrieval is requested, there is discriminated whether such request is for the film already set in the reading position or for another film (S114). In the former case, the above-explained retrieval operation is conducted without the light quantity regulation. On the other hand, in the latter case, the light quantity regulation is repeated again before the loading another film and retrieval thereon.

If no repeated reading nor new retrieval is requested, the image reading operation is terminated, and the program awaits the entry of a new command for image reading or image retrieval.

In this manner the image reading operation can always be conducted with an optimum light quantity since it is regulated prior to the loading of a film to the reading position, and still the image reading operation can be completed rapidly as the light quantity regulation is omitted for reading a same film where the change in the quantity of light should be limited in time.

Figure 4:
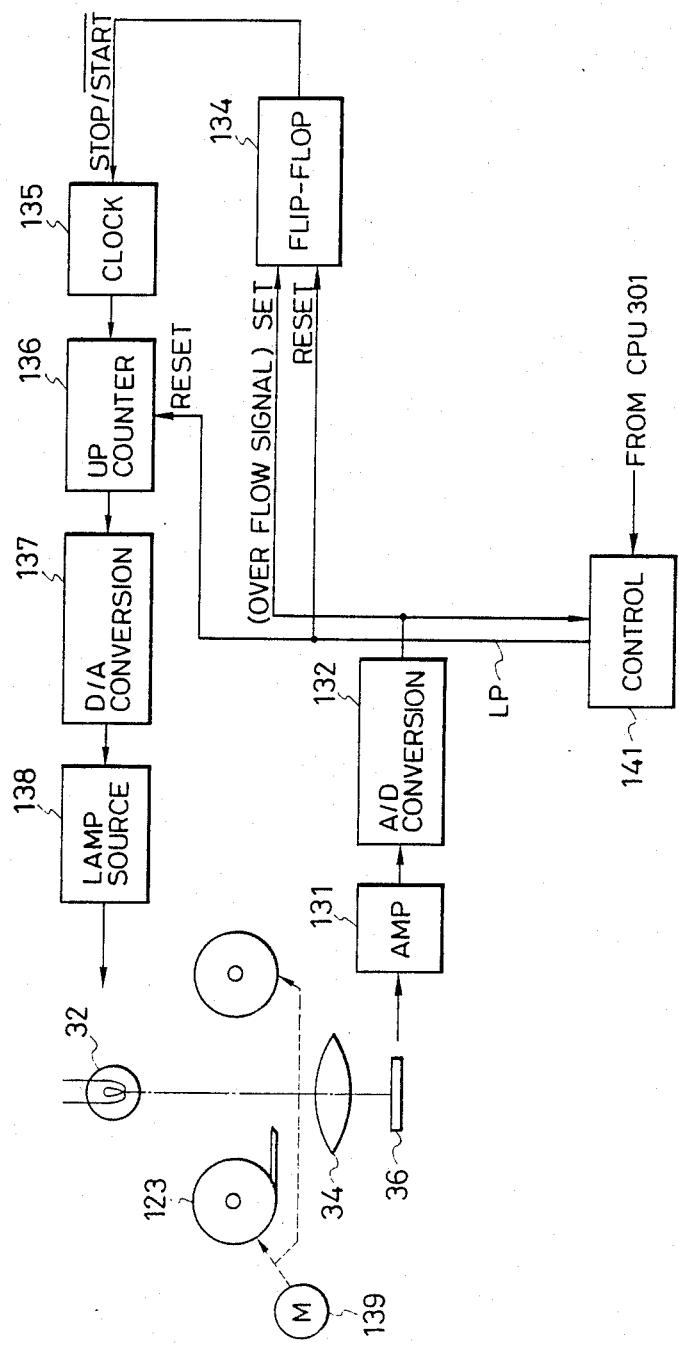
FIG. 4 is a block diagram of a light amount control circuit.
Figure 5:
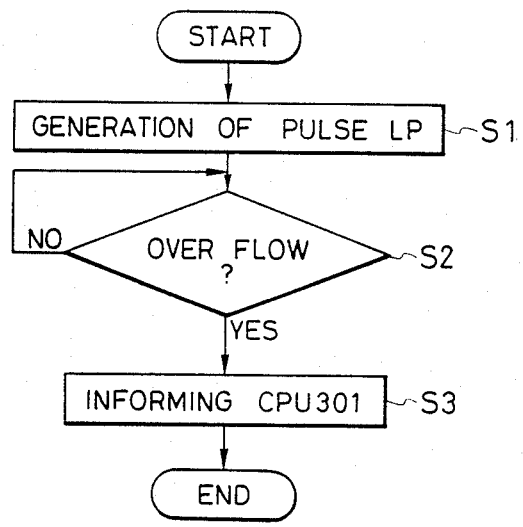
FIG. 5 is a flow chart showing the control sequence of a control unit 141.
Figure 6:
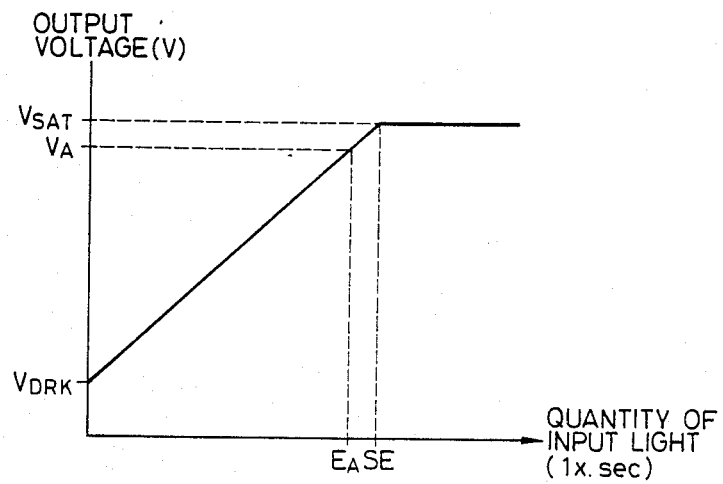
FIG. 6 is a chart showing an example of an input-output characteristic of an image sensor.

FIG. 4 shows an example of the light control circuit 302 shown in FIG. 2, and FIG. 5 shows the control sequence for light quantity control. A corresponding program is stored in advance in a memory, in a microcomputer constituting a control unit 141 to be explained later. FIG. 6 shows an example of light input-voltage output characteristic of the image sensor 36.

In order to fully exploit the performance of image sensor 36, the quantity of light is preferably regulated in such a manner that the lightest area in the image provides a light amount $E_A$ slightly lower than a saturation exposure SE. A higher quantity of light will result in a saturated output voltage, while a lower quantity of light will result in a loss in the S/N ratio.

Such optimum condition can be attained by gradually increasing the quantity of light, while the film is absent from the reading position, until the image sensor 36 provides a voltage $V_A$ which is lower, by a predetermined amount, than the saturation output voltage $V_{SAT}$ found in the characteristic data of the image sensor 36.

In FIG. 4 there are the lamp 32 adapted to emit a variable quantity of light lens 34, and photoelectric image sensor 36 for image reading.

Now reference is made to FIGS. 4 and 5 for explaining the details of the automatic light quantity control operation.

In accordance with the light amount control signal, instructing the start of the light quantity control operation, from the CPU 301 shown in FIG. 2, a control unit 141 starts this operation.

While the microfilm is absent from the reading position, the control unit 141 releases a light amount setting start pulse LP (S1), which resets an up-counter 136 and a flip-flop 134, whereupon a clock generator 135 is activated and starts to generate clock pulses of a predetermined frequency, which are counted by up-counter 136. The count of up-counter 136 is converted into an analog value by a D/A converter 137. Thus the power supplied to the lamp 32 is gradually increased, together with the increase in the count, thus gradually increasing the quantity of light. The light quantity is detected by the image sensor 36, then amplified by an amplifier 131 and converted into a digital value of a predetermined number of bits by an A/D converter 132. Thus obtained digital value gradually increases in accordance with the quantity of light, and generates an overflow at a certain point. At this point the flip-flop 134 is reset to terminate the clock pulses from the clock generator 135. Consequently the count of the up-counter 136 is retained at this point, and the output of the D/A converter 137 is also retained to stabilize the quantity of light.

In accordance with this overflow signal, the control unit 141, identifies the completion of light quantity control, terminates the operation (S2) and informs the CPU 301 of this fact (S3).

Thus the quantity of light can be regulated to an optimum value for fully exploiting the performance of the image sensor 36, if the gain of the amplifier 131 is so regulated in advance that the maximum output of the A/D converter 132 is slightly lower than the saturation output voltage of the image sensor 36.

In this manner the lamp control circuit 302 effects the light quantity control operation, in accordance with the actuation of the power switch and under the control of the CPU 301.

In the foregoing explanation the quantity of light emitted by the lamp is gradually increased, but it is also possible to gradually reduce the quantity of light from a predetermined value and to fix the light quantity at a point where the overflow signal from the A/D converter 132 vanishes. Furthermore it is possible to determine the optimum quantity of light through a combination of an increase and decrease of an the light quantity.

Furthermore it is possible to select the optimum light quantity at a point before the output of the image sensor reaches the predetermined value, in consideration of a response time delay in the change of the quantity of light to a change in the voltage supplied to the lamp.

Figure 7:
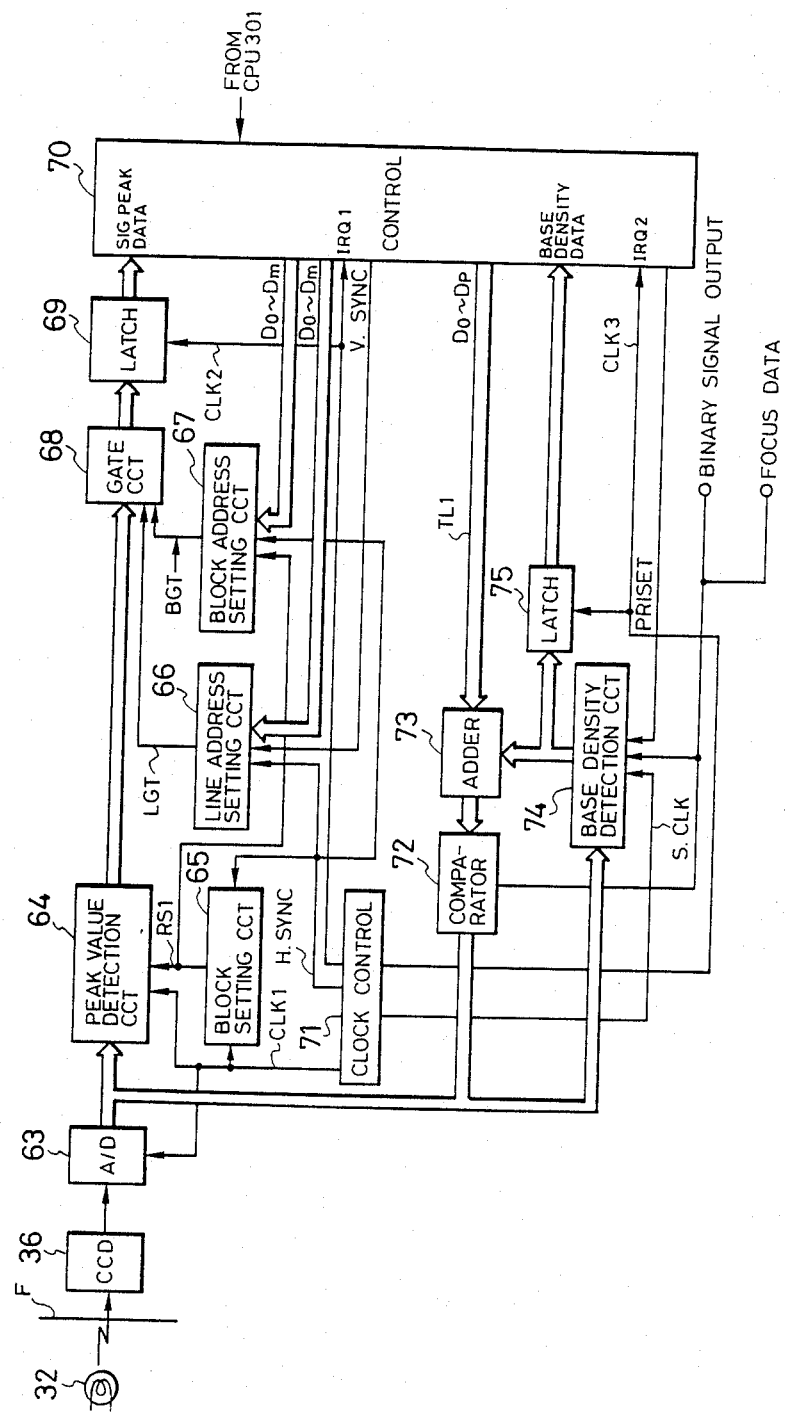
FIG. 7 is a block diagram of an image process circuit.

FIG. 7 shows an example of the image process circuit 304 shown in FIG. 2.

In the present embodiment, the image set to the reading position of the image reading apparatus is read twice, and data obtained from the image sensor 36 in the first reading is utilized to perform an automatic exposure operation for determining a threshold value for binary encoding the image signal, and image information obtained in the second reading is binary encoded by the threshold value determined in the first reading.

In FIG. 7, the lamp 32 illuminates the microfilm F. The image sensor 36, for example a CCD, reads the image of said microfilm F, by means of light transmitted through the same. The quantity of light emitted by said lamp 32 is controlled by the lamp control circuit 302, in such a manner, as explained before, as to enable image reading with the image sensor 36 in an optimum ½ state. At said image reading, the automatic focusing has been completed by the automatic focusing circuit 303.

An A/D converter 63 converts the analog image signal from the image sensor 36 into a digital signal of N bits representing the density of each pixel.

A peak detection circuit 64, for detecting the light peak of the image signal, detects the peak value in each of plural blocks of the image signal of a scanning operation. A block setting circuit 65 divides the image signal, obtained in a scanning operation, into blocks of a predetermined number of pixels each.

The block setting circuit 65 serves to divide a scanning line into a certain number of blocks, and is composed of a frequency divider, composed of an N bit counter, which is triggered by a horizontal synchronization signal HSYNC which is synchronized with each scanning operation of the image sensor 36. Thus a scanning line is divided into an: arbitrary number of blocks of N bits each.

Block setting circuit 65 is reset by signal HSYNC, counts clock pulses CLK1 from a clock control circuit 11 and supplies a reset signal RSI at every N counts to the peak detection circuit 64. Consequently a main scanning period, defined by immediately following two horizontal synchronization signals HSYNC, is divided into m blocks. The number m is suitably selected in consideration of the dimension of characters and symbols recorded on the microfilm.

As explained above, the block setting circuit 65 supplies the reset signal RSI to the peak detection circuit 64, whereby the peak detection circuit 64 always detects the peak value in each block.

A line address setting circuit 66 sets an address area in the sub scanning direction.

Figure 8:
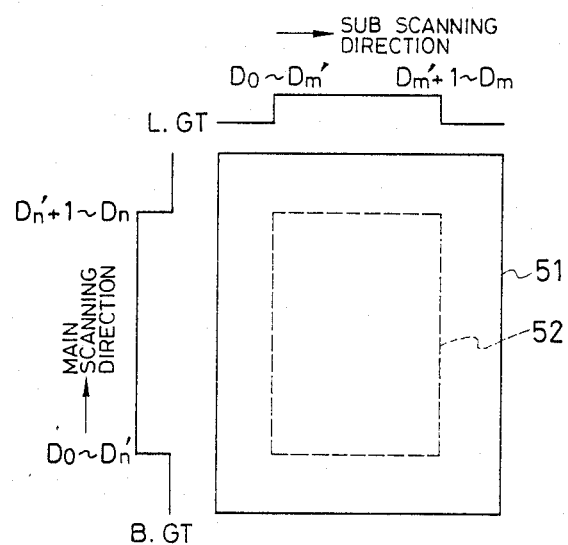
FIG. 8 is a schematic view showing an effective image area.

A block address setting circuit 67 sets a block area in the scanning. A control unit 70 presets n-bit data (D0—Dn) and m-bit data (D0—Dm) respectively in the line address setting circuit 66 and the block address setting circuit 67, thereby defining an image area, as shown in FIG. 8, for determining the binary encoding threshold value. In FIG. 8, 51 indicates the entire image reading area, while 52 indicates the threshold value determining area. In determining the threshold value, there is defined an area smaller than the entire image reading area as explained above, and only the peak values obtained in the area are considered effective. In this manner it is rendered possible to disregard the peak values obtained outside the image area, even if the image size or image position fluctuates on the film. The area should naturally be selected in size and position where the image should always exist.

The line address setting circuit 66, being triggered by a vertical synchronization signal VSYNC indicating the reading period of an image frame, counts the horizontal synchronization signals HSYNC and releases a line gate signal L, GT continuing from the start to the end of the area, by comparing the count with an area start address (D0—Dm') and an area end address (Dm'+1—Dm) in the sub scanning direction, supplied from the control unit 70.

In this manner the area in the sub scanning direction can be defined by the line gate signal.

Also the block address setting circuit 67, being triggered by the horizontal synchronization signal HSYNC, counts the reset signal RSI released by the block setting circuit 65, and generates a block area signal B, GT continuing from the start to the end of the area in the main scanning direction, by comparing the count with a block area start address (D0—Dn') and a block area end address (n'+1—Dn).

In this manner the area in the main scanning direction can be defined by the block area signal.

In FIG. 7, a gate 68 serves to transmit, among the peak values detected by the peak detection circuit 64, only those detected in the two-dimensional area 52 defined, as shown in FIG. 8, by the block address setting circuit 67 and the line address setting circuit 66.

A latch 69 determines the timing of fetching the peak value in the control unit 70 in accordance with the clock signal CLK2, and control unit 70 is composed of a microcomputer for controlling the image process circuit. The control unit 70 fetches the data latched in the latches 69, 75, respectively in synchronization with the clock signals CLK2, CLK3. A clock control circuit 71 generates various timing clock signals utilized as reference for the function of the apparatus.

A comparator 72 generates a binary image signal by comparing the image signal with the threshold value determined in a predetermined procedure.

An adder 73 supplies the comparator 72 with the threshold value, obtained by adding the output of a base density detecting circuit 74 to be explained later with threshold value information TL1 (D0—Dp) from the control unit 70.

The base density detecting circuit 74 detects the approximate base density from the digital image signal from the A/D converter 63. A timing clock signal CLK3 defines the timing of fetching the approximate base density into the control unit 70. A latch 75 serves to fetch an approximate base density signal into the control unit 70 in synchronization with the sampling clock signal CLK3.

Figure 9:
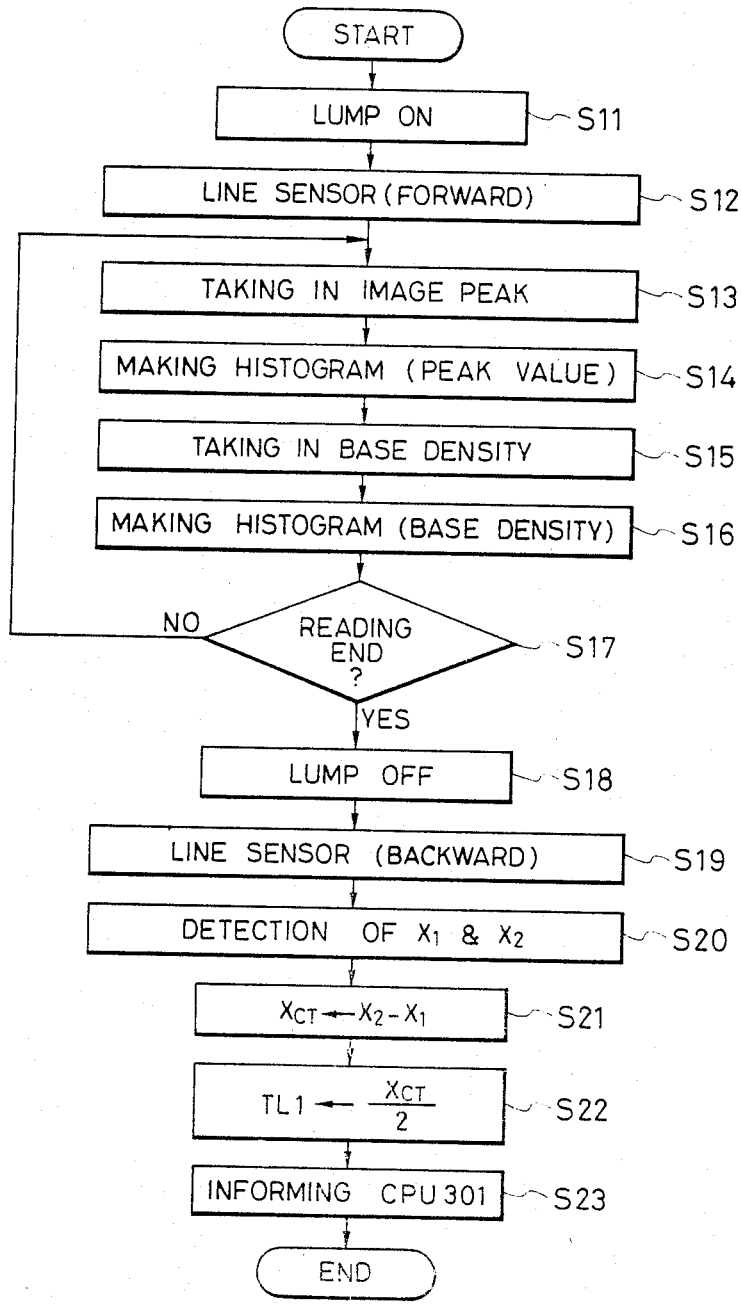
FIG. 9 is a flow chart showing the control sequence of a control unit 70.

In the following there will be explained the function of the image process circuit, while making reference to FIG. 9 showing the control sequence of the control unit 70. A corresponding program is stored in advance in an internal memory ROM of the control unit 70.

After an image frame to be read of the microfilm is set in the reading position to enable the image reading operation, and, in response to an automatic exposure start command from the CPU 301 shown in FIG. 2, the control unit 70 turns on the lamp 32 (S11), and instructs the CCD sub scanning device, through the CPU 301, to move the image sensor 36 in the forward direction (S12), in order to initiate the first image reading for determining the binary encoding threshold value.

Then the peak data and the approximate base density data of the digital image signal (Sig) are fetched in the threshold determining area defined as explained before (S13, S15).

When the first image reading is completed in this manner (S17), the lamp 32 is turned off and the image sensor 36 is returned (S18, S19). Then the control unit 70 prepares, from thus fetched data, two histograms representing density and frequency respectively in the abscissa and ordinate (S14, S16) in order to determine the binary encoding threshold value.

The first histogram represents the approximate base density component, obtained by sampling the lowest level of the image signal by the base density detecting circuit 74.

The second histogram represents the peak data in the aforementioned threshold determining area, obtained by sampling the areas of highest transmission in case of a negative film.

The second histogram has two peaks, of which one at the lower density indicates the base density, while the other at the higher density indicates the peak of the image signal. A density level X2 corresponds to the highest frequency of signal peak value in the sampling image area in a film of a first base density. In the first histogram, X1 is an approximate base density close to the base density in the sampling image area, corresponding to the highest frequency of sample data obtained by the base density detecting circuit 74.

In general the base density of a film is not constant but varies from film to film according to film finishing conditions etc.

In the thus defined histograms, there are determined a representative value X1 of the approximate base density and a representative value X2 of the peak density (S20), and the contrast XCT is defined by the difference of these two values, X2—X1 (S21). A half of the contrast XCT is supplied, as the threshold value information TL1, to the adder 73 (X22). Then the completion of determination of the threshold information is advised to the CPU 301 (X23), and the sequence is terminated.

The adder 73 adds the base density from the base density detecting circuit 74 to the threshold information TL1, and supplies the thus determined threshold value to the comparator 72.

In this manner the threshold value is determined in consideration of the image recorded on the film and the base density thereof, and is utilized in the comparator 12 for binary encoding the digital image signal released from the A/D converter 3 in the second image reading, thereby obtaining a binary image signal.

Figure 10:
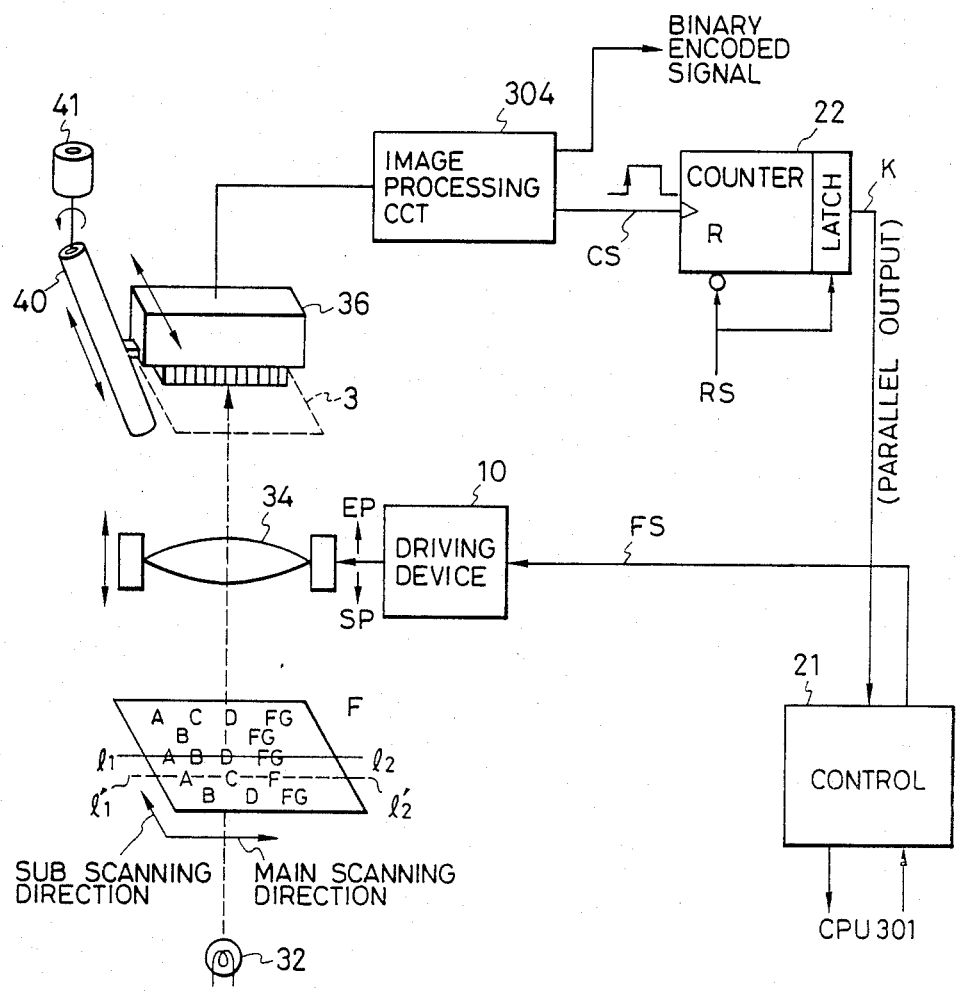
FIG. 10 is a block diagram of an automatic focusing circuit.

FIG. 10 shows an example of the automatic focusing circuit shown in FIG. 2.

In FIG. 2, a microfilm F bearing an image on the top or bottom face thereof is illuminated by the light from the lamp 32. The imaging lens 34 is vertically movable by a mechanism which converts the rotary motion of a stepping motor into a linear motion.

The image focused by the lens 34 is projected on the image sensor 36 having a linear array of plural photosensor elements. The direction of the array, or the direction of self-scanning, of the image sensor 36 is called the main scanning direction.

The sub scanning in a direction substantially perpendicular to the main scanning direction is conducted by moving the image sensor 36 in such perpendicular direction by means of the wire 40 and the sub scanning motor 41. In this manner an image frame on the film can be read line by line.

The analog image signal read by the image sensor is binary encoded by the aforementioned image process circuit 304, and is then supplied to an image forming apparatus such as a laser beam printer, or an optical disk device.

A control unit 21 releases a control signal FS for moving the lens 34.

The number of starting (or ending) edges of binary signal released by the image process circuit 304 is called focus information, and is counted by a counter 22.

The automatic focusing is achieved by moving the imaging lens 34 so as to increase the number of edges.

Since the lens approaches to the in-focus state as the number of edges increases, the control unit 21 identifies the count of the counter 22 and so moves the imaging lens 34 as to maximize the count.

Figure 11A:
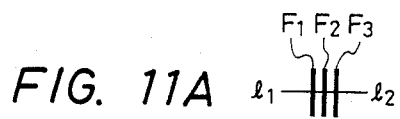
FIGS. 11A and 11B are schematic views of images recorded on film.

In the following there will be explained the function. FIG. 11A shows a part of image information recorded on the film F. Usually a microfilm beams a negative image, so that black portions in FIG. 11 transmit light while white portions do not transmit light.

Figure 11B:
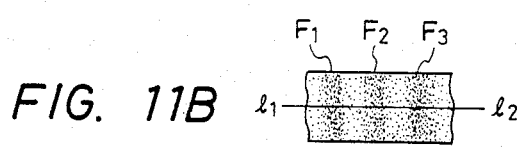
Figures 12A, 12B:
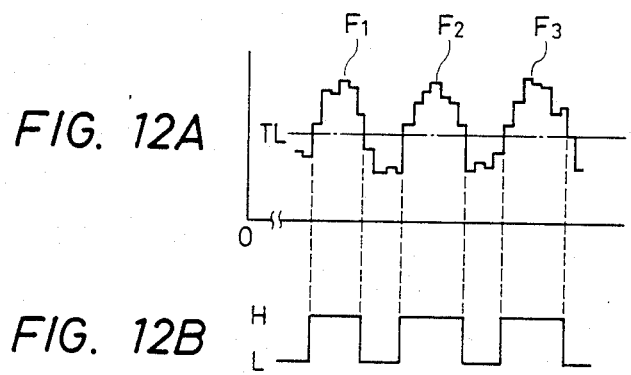
FIGS. 12A and 12B are charts showing an image sensor outputs.

FIG. 11B is an enlarged view of FIG. 11A, and stripes F1, F2, F3 become thinner as they become distant from the central portion. When this image is read by the image sensor along a line l1−l2, there is obtained an output wave form as shown in FIG. 12A. Stepwise forms in the output respectively correspond to the photosensor elements in the image sensor.

This output wave form is binary digitized by the image process circuit 304 to obtain an output signal CS shown in FIG. 12B, which is then supplied to the counter 22. The counter 22 is reset by the reset signal RS at each scanning operation of the image sensor. The counter 22 is provided with a latch for storing an immediately preceding value, in synchronization with the resetting.

In this manner the counter 22 counts the number of edges of the output signal CS in each main scanning period of the image sensor.

Figure 13A:
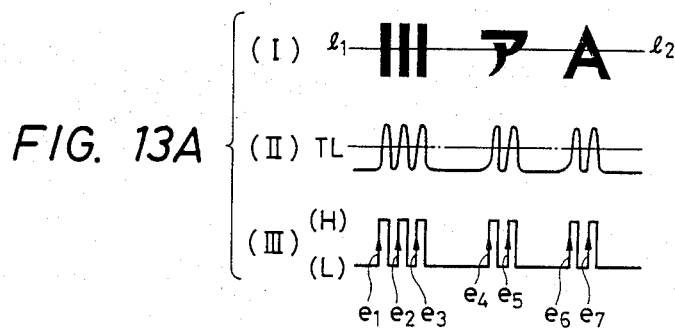
FIGS. 13A and 13B are charts showing the principle of the focusing operation of the present invention.
Figure 13B:
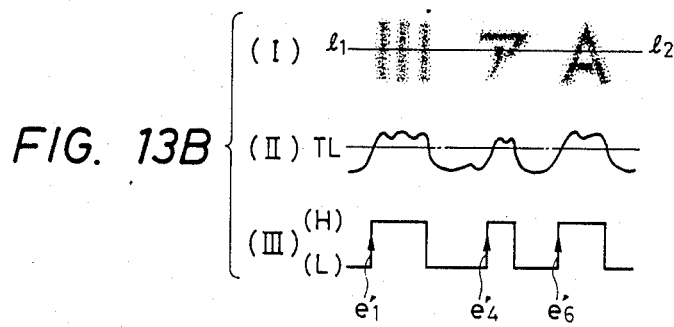

FIG. 13A shows an in-focus state, while FIG. 13B shows an out-of-focus state.

A main scanning with the image sensor of the image (I) in FIG. 13A along a line l1−l2 provides and output (II). The actual output assumes a stepwise form which however is omitted for the purpose of simplicity. The binary encoding of said output with a threshold value TL provides an output signal CS (III). The foregoing corresponds to an in-focus state.

In an out-of-focus state shown in FIG. 13B, a blurred image (I) on the image sensor is scanned along a line l1−l2 to provide an output signal (II) which has a fewer number of crossings of the threshold value TL. Thus, in the output signal CS, the number of start edges is reduced to three (e'1, e'4, e'6) as shown in (III) and is evidently smaller than in the in-focus state.

In this manner the state of focusing can be identified by counting the number of the above-mentioned start edges e.

In accordance with the focus information or count, the control unit 21 moves the lens 34 so as to maximize the count, thus bringing the lens to the in-focus position.

FIG. 14 is a flow chart showing the control sequence of the automatic focusing by the control unit 21.

In accordance with an automatic focusing start command from the CPU 301 shown in FIG. 2, a step S31 activates the stepping motor for driving the lens 34, thus setting the lens at a start point SP. Then a step S32 causes the CPU 301 to effect a main scanning in the image sensor 36, without sub scanning movement thereof. In each main scanning of a line by the image sensor 36, the count of the counter 22, indicating the number of focus information, is stored in the memory, together with the number of steppings of the stepping motor. A step S34 then discriminates whether the lens 34 has reached an end point EP. If not, the program proceeds to a step S33 to activate the lens-moving stepping motor by a step, thereby moving the lens 34 toward the end point by a step. Then the step S32 is again executed to cause the image sensor to effect a main scanning, and to count and store the focus information. This procedure is repeated until the lens 34 reaches the end point. In this manner the memory stores the counts of the counter 22 in plural main scannings conducted during the movement of the lens 34 from the start point to the end point.

When the lens 34 reaches the end point, a step S35 detects the maximum value of the counts stored in the memory, and identifies a number of steppings of the stepping motor corresponding to the maximum count. A step S37 activates the stepping motor of the driving device 10 in order to displace the lens 34 to a position corresponding to thus identified number of steppings. In this manner the lens is brought to the in-focus position. Upon completion of the focusing of the lens 34, a step S37 informs the CPU 301 of this fact.

In the foregoing embodiment, the operations of light amount control, automatic exposure control and automatic focusing are conducted utilizing the output of the image sensor for image reading, but it is also possible to achieve each operation utilizing an exclusive sensor other than said image-reading sensor.

Also the foregoing embodiment is applicable not only to microfilms but also 35 mm films or medical X-ray films, and each of the operations of light amount control, automatic exposure control and automatic focusing may be achieved through another structure.

The above-explained embodiment for reading a film recorded image, which regulates the quantity of light for illuminating the film before the film is set to the reading position, then regulates the focusing and determines the threshold value for quantizing the image signal, allows to fully exploit the function of each operation, thereby enabling satisfactory film image reading without manual adjustment.

In the foregoing embodiment, the light quantity of the illuminating light source is optimized for each new loading of a microfilm to the reading position. However, if the light source can maintain a stable light quantity once the power supply is fixed, or if the ambient conditions of the apparatus are so stable as to little affect the light quantity, such frequent light quantity regulations are in fact unnecessary and waste the time.

In such case, it is therefore desirable to adopt a following control sequence for the CPU 301 in the aforementioned microfilm reading apparatus.

Figure 15:
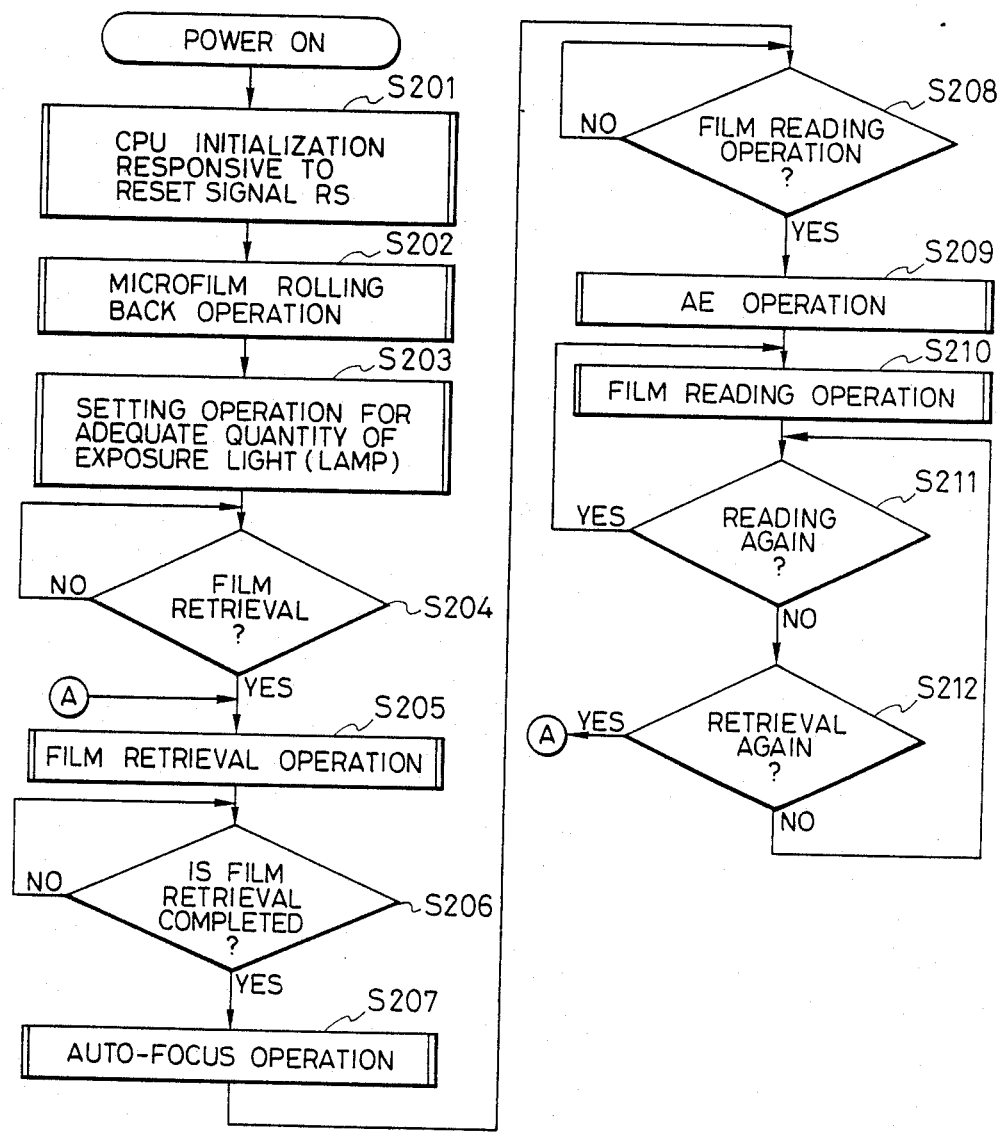
FIG. 15 is a flow chart showing another control sequence of the CPU 301.

FIG. 15 is a flow chart showing a second control sequence for the CPU 301. A corresponding program is stored in advance in an internal ROM of the CPU 301.

Upon entry of the reset signal RS from the reset signal generator 11 in accordance with the actuation of the power switch 140, the CPU 301 initializes registers, memories and ports (S201), and it then rewinds the film by activating the film transport devices 123, 139 (S202), so as to remove the film from the reading position. After the rewinding operation, or, if the film is absent in the reading position from the beginning, it turns on the lamp 32, detects the quantity of light thereof by the image sensor 36 and supplies a light amount control signal to the lamp control circuit 302 in order to obtain a predetermined light quantity (S203).

After the light quantity control, it discriminates whether an image frame retrieval command has been entered from an unrepresented control unit (S204). In the presence of such command, it activates the film transport devices 123, 139 to bring the designated image frame to the reading position (S205).

When the retrieval of the designated frame of the film F is completed (S206), the automatic focusing circuit 303 is activated to focus the image of the frame in the reading position, in accordance with the image signal from the image sensor 36 (S207). The focusing operation can be conducted satisfactorily since the quantity of light has already been optimized. After the lens 34 has been moved to the in-focus position by the automatic focusing operation, there is discriminated whether a reading command has been entered from the aforementioned control unit (S208).

In the presence of such reading command, the image process circuit 304 is activated to effect the automatic exposure control operation for determining the threshold value for binary encoding the analog image signal from the image sensor (S209). In this operation the image frame at the reading position is read by the image sensor 36 while it is moved by the CCD sub scanning device 12, and the image process circuit 304 determines the threshold value corresponding to the image density obtained from the analog image signal. The operation can be conducted satisfactorily since the light quantity and the focusing have been optimized.

Upon determination of the threshold value in this manner, the image sensor 36 is moved by the CCD sub scanning device 12 and effects image reading to supply binary image signal to the recording apparatus 305 (S210). Upon completion of the image reading, there is discriminated whether a repeated image reading is requested (S211), and, if requested, the image reading operation is repeated. On the other hand, in the absence of such request, there is discriminated whether a retrieval of another image frame is requested (S212), and, if requested, there are conducted retrieval and reading of the designated image frame. On the other hand, in the absence of such request, the reading operation is terminated, and the program awaits the entry of a new command for image reading or retrieval.

When another microfilm is loaded on the apparatus and an image reading therefor is requested, there are conducted frame retrieval, automatic focusing, automatic exposure control and image reading. In this case the light quantity control for the lamp 32 is omitted, so that the image reading can be completed quickly.

However, the quantity of light is always controlled at the start of power supply to the apparatus, so that satisfactory image reading operation is always ensured for any eventual time-dependent change of the lamp performance.

The above-explained second control sequence for reading a film image reading, which regulates the quantity of light for illuminating the film only at the start of power supply to the apparatus, then regulates focus state of the image and determines the threshold value for quantizing the image signal, allows to fully exploit the function of each operation, thus enabling satisfactory film image reading without manual control.

Also in case the light source can maintain a stable quantity of light once the power supply thereto is fixed, or in case the ambient conditions of the apparatus are so stable as to little affect the light quantity, the second control sequence allows to a waste in time for light quantity control and enables to achieve rapid image reading operation.

The focusing and threshold value determination which are affected by the loading state of the film or the images recorded thereon are conducted for each film loading to the reading position, thereby enabling satisfactory image reading.

Though the present invention has been explained by preferred embodiments thereof, it is by no means limited to such embodiments but is subject to various modifications and variations within the scope and spirit of the appended claims.

What is claimed is:
1. An image reading method for reading an image on a film by focusing light from a light source through said film into an image sensor by means of an optical member, comprising the steps of:
   regulating the quantity of light emitted by said light source before said film is set to a reading position;
   focusing said optical member in accordance with the light transmitted through said film illuminated with light regulated in said regulating step, after said film is set to said reading position; and
   determining a threshold value for quantizing the output of said image sensor in accordance with the light transmitted through said film illuminated with the regulated light after the completion of focusing of said optical member in said focusing step.

2. An image reading method according to claim 1, wherein said regulating step comprises the step of regulating the quantity of light emitted by said light source in accordance with the output of said image sensor.

3. An image reading method according to claim 1, wherein said focusing step comprises the step of focusing said optical member in accordance with the output of said image sensor.

4. An image reading method according to claim 1, wherein said determining step comprises the step of determining the threshold value in accordance with the output of said image sensor.

5. An image reading method according to claim 1, further comprising a step for setting the film to said reading position after the completion of light quantity control of said light source in said regulating step.

6. An image reading method for reading an image on a film by focusing light from a light source through said film onto an image sensor by means of an optical member, comprising the steps of:
   regulating the quantity of light supply of power to said light source;
   focusing said optical member in accordance with the light transmitted through said film illuminated with light regulated in said regulating step, after said film is set to a reading position; and
   determining a threshold value for quantizing the output of said image sensor in accordance with the light transmitted through said film illuminated with the regulated light after the completion of focusing of said optical member in said focusing step.

7. An image reading method according to claim 6, wherein said regulating step comprises the step of regulating the quantity of light emitted by said light source in accordance with the output of said image sensor.

8. An image reading method according to claim 6, wherein said focusing step comprises the step of focusing said optical member in accordance with the output of said image sensor.

9. An image reading method according to claim 6, wherein said determining step comprises the step of determining the threshold value in accordance with the output of said image sensor.

10. An image reading method according to claim 6, further comprising a step for setting the film to said reading position after the completion of light quantity control of said light source in said regulating step.

11. An image reading apparatus for reading an image on a film by focusing light from a light source through said film into an image sensor by means of an optical member, comprising:
    first regulation means for regulating the quantity of light emitted by said light source;
    second regulation means for regulating the focus of said optical member;
    third regulation means for regulating a threshold value for quantizing the output of said image sensor; and
    control means for controlling said first, second and third regulation means, wherein said control means causes said first regulation means to regulate the quantity of light emitted by said light source before the film is set to a reading position, then causes said second regulation means to regulate the focus of said optical member in accordance with the light transmitted through the film illuminated with light regulated by said first regulation means after the film is set to said reading position, and causes said third regulation means to regulate the threshold value in accordance with the light transmitted through the film from the regulated light source after the completion of focus regulation by said second regulation means.

12. An image reading apparatus according to claim 11, further comprising means for setting said film to said reading position.

13. An image reading apparatus according to claim 11, wherein said first regulation means is adapted to regulate the quantity of light emitted by said light source in accordance with the output of said image sensor.

14. An image reading apparatus according to claim 11, wherein said second regulation means is adapted to regulate the focus of said optical member in accordance with the output of said image sensor.

15. An image reading apparatus a according to claim 11, wherein said third regulation means is adapted to determine the threshold value in accordance with the output of said image sensor.

16. An image reading method according to claim 1, wherein said regulating step comprises the step of controlling the amount of electric power to be supplied to said light source.

17. An image reading method according to claim 1, further comprising the step of causing said image sensor to read the image of said film after the completion of the determination of the threshold value in said determining step.

18. An image reading method according to claim 1, further comprising the step of quantizing the output of said image sensor in accordance with the threshold value determined in said determining step.

19. An image reading method according to claim 6, wherein said regulating step comprises the step of controlling the amount of electric power to be supplied to said light source.

20. An image reading method according to claim 6, further comprising the step of causing said image sensor to read the image of said film after the completion of the determination of the threshold value in said determining step.

21. An image reading method according to claim 6, further comprising the step of quantizing the output of said image sensor in accordance with the threshold value determined in said determining step.

22. An image reading apparatus according to claim 11, wherein said first regulation means controls the amount of electric power to be supplied to said light source.

23. An image reading apparatus according to claim 11, wherein said control means causes said image sensor to read the image of the film after the completion of the regulation of the threshold value by said third regulation means.

24. An image reading apparatus according to claim 11, further comprising means for quantizing the output of said image sensor in accordance with the threshold value regulated by said third regulation means.

25. An image reading apparatus for reading an original image by focusing light from the original image illuminated by a light source onto an image sensor by means of in optical member, comprising:
    first regulation means for regulating the quantity of light emitted by said light source;
    second regulation means for regulating the focus of said optical member;
    third regulation means for regulating a process parameter for processing an output of said image sensor; and
    control means for controlling said first, second and third regulation means, wherein said control means causes said first regulation means to regulate the quantity of light emitted by said light source before the original image is set to a reading position, then causes said second regulation means to regulate the focus of said optical member in accordance with the light from the original image illuminated with light regulated by said first regulation means after the original image is set to said reading position, and causes said third regulation means to regulate the process parameter in accordance with the light from the original image illuminated by the regulated light source after the completion of focus regulation by said second regulation means.

26. An image reading apparatus according to claim 25, further comprising means for setting the original image to said reading position.

27. An image reading apparatus according to claim 25, wherein said first regulation means is adapted to regulate the quantity of light emitted by said light source in accordance with the output of said image sensor.

28. An image reading apparatus according to claim 25, wherein said second regulation means is adapted to regulate the focus of said optical member in accordance with the output of said image sensor.

29. An image reading apparatus according to claim 25, wherein said third regulation means is adapted to determine the process parameter in accordance with the output of said image sensor.

30. An image reading apparatus according to claim 25, wherein said first application means controls an amount of electric power supplied to said light source.

31. An image reading apparatus according to claim 25, wherein said control means causes said image sensor to read the original image after the completion of the regulation of the process parameter by said third regulation means.

32. An image reading apparatus according to claim 25, further comprising means for processing the output of said image sensor in accordance with the process parameter regulated by said third regulation means.

33. An image reading apparatus according to claim 25, wherein said light source is adapted to illuminate an image on a film, and wherein said optical member is adapted to focus light through the illuminated film onto said image sensor.

34. An image reading method for reading an optical image by focusing light from the original image illuminated by a light source onto an image sensor by means of an optical member, comprising the steps of:

regulating the quantity of light emitted by said light source before the original image is set to a reading position;

focusing said optical member in accordance with the light from the original image illuminated with light regulated in said regulating step, after the original image is set to said reading position; and determining a process parameter for processing the output of said image sensor in accordance with the light from the original image illuminated with the regulated light after the completion of focusing of said optical member in said focusing step.

35. An image reading method according to claim 34, wherein said regulating step comprises the step of regulating the quantity of light emitted by said light source in accordance with the output of said image sensor.

36. An image reading method according to claim 34, wherein said focusing step comprises the step of focusing said optical member in accordance with the output of said image sensor.

37. An image reading method according to claim 34, wherein said determining step comprises the step of determining the process parameter in accordance with the output of said image sensor.

38. An image reading method according to claim 34, further comprising the step of setting the original image to said reading position after the completion of light quantity control of said light source in said regulating step.

39. An image reading method according to claim 34, wherein said regulating step comprises the step of controlling the amount of electric power to be supplied to said light source.

40. An image reading method according to claim 34, further comprising the step of causing said image sensor to read the original image after the completion of the determination of the process parameter in said determining step.

41. An image reading method according to claim 34, further comprising the step of processing the output of said image sensor in accordance with the process parameter determined in said determining step.

42. An image reading method according to claim 34, wherein said light source is adapted to illuminate an image on a film, and said optical member is adapted to focus a light from the illuminated film on to said image sensor.

* * * * *

UNITED STATES PATENT AND TRADEMARK OFFICE
CERTIFICATE OF CORRECTION

PATENT NO. : 4,825,065
DATED : April 25, 1989
INVENTOR(S) : Ryoichi Imai

It is certified that error appears in the above-identified patent and that said Letters Patent is hereby corrected as shown below:

IN FIG. 7:

Below LATCH 75, change "PRISET" to --PRESET--.

COLUMN 1:

Line 24, change "thus the" to --the thus--.

Line 53, change disclose,," to --disclose,--.

COLUMN 2:

Line 25, change "circuits" to --circuits of--.

Line 43, delete "an".

COLUMN 3:

Line 40, change "star" to --start--.

COLUMN 4:

Line 5, change "accordance" to --in accordance--.

UNITED STATES PATENT AND TRADEMARK OFFICE
CERTIFICATE OF CORRECTION

PATENT NO. : 4,825,065
DATED : April 25, 1989
INVENTOR(S) : Ryoichi Imai

It is certified that error appears in the above-identified patent and that said Letters Patent is hereby corrected as shown below:

COLUMN 5:

Line 5, change "loading" to --loading of--.

Line 38, change "are" to --is--.

COLUMN 6:

Line 22, change "decrease of an" to --a decrease of--.

Line 26, delete "the" (second occurrence).

Line 41, delete "said".

Line 62, change "an:" to --an--.

COLUMN 12:

Line 48, change "into" to --onto--.

COLUMN 13:

Line 13, change "light supply" to --light emitted by said light source at the time of the start of the supply--.

Line 42, change "into" to --onto--.

UNITED STATES PATENT AND TRADEMARK OFFICE
CERTIFICATE OF CORRECTION

PATENT NO. : 4,825,065

DATED : April 25, 1989

INVENTOR(S) : Ryoichi Imai

It is certified that error appears in the above-identified patent and that said Letters Patent is hereby corrected as shown below:

COLUMN 14:

Line 10, delete "a".

Line 56, change "in" to --an--.

COLUMN 16:

Line 46, change "on to" to --onto--.

Signed and Sealed this

Twentieth Day of February, 1990

Attest:

JEFFREY M. SAMUELS

Attesting Officer    Acting Commissioner of Patents and Trademarks